United States Patent [19]

Nielsen

[11] Patent Number: 5,784,056
[45] Date of Patent: Jul. 21, 1998

[54] SYSTEM AND METHOD FOR TEMPORALLY VARYING POINTER ICONS

[75] Inventor: Jakob Nielsen, Atherton, Calif.

[73] Assignee: Sun Microsystems, Inc., Palo Alto, Calif.

[21] Appl. No.: 580,729

[22] Filed: Dec. 29, 1995

[51] Int. Cl.$^6$ ........................................................ G06F 3/00
[52] U.S. Cl. .............................. 345/332; 345/349; 345/977
[58] Field of Search .............................. 395/348, 349, 395/329–332, 200.34–200.37; 345/326–358, 970, 973, 145, 146, 977, 473–475

[56] References Cited

U.S. PATENT DOCUMENTS

| | | | |
|---|---|---|---|
| 4,953,159 | 8/1990 | Hayden et al. | 395/330 |
| 4,974,173 | 11/1990 | Stefik et al. | 395/331 |
| 5,107,443 | 4/1992 | Smith et al. | 345/332 X |
| 5,282,266 | 1/1994 | Schnaible et al. | 395/128 |
| 5,303,388 | 4/1994 | Kreitman et al. | 345/349 X |
| 5,319,747 | 6/1994 | Gerrissen et al. | 395/155 |
| 5,337,407 | 8/1994 | Bates et al. | 395/153 |
| 5,361,091 | 11/1994 | Hoarty et al. | 348/7 |
| 5,375,199 | 12/1994 | Harrow et al. | 395/159 |
| 5,392,400 | 2/1995 | Berkowitz et al. | 345/332 X |
| 5,430,875 | 7/1995 | Ma | 395/650 |
| 5,437,014 | 7/1995 | Busboom et al. | 395/275 |
| 5,444,476 | 8/1995 | Conway | 348/15 |
| 5,515,491 | 5/1996 | Bates et al. | 395/155 |
| 5,542,040 | 7/1996 | Chang et al. | 395/155 |
| 5,544,317 | 8/1996 | Berg | 395/200.04 |
| 5,584,035 | 12/1996 | Duggan et al. | 395/800 |

FOREIGN PATENT DOCUMENTS

| | | | |
|---|---|---|---|
| 02288046 | 10/1990 | Japan | G06F 3/14 |
| 04 160628 | 6/1992 | Japan | G06F 3/14 |

OTHER PUBLICATIONS

Frivold T. J. et al., "Extending WWW for Synchronous Collaboration," *Computer Networks and ISDN Systems*, vol. 28, No. 1/02, pp. 69–75.

Higginbotham A. F. et al., "Teleconference Systems," *IBM Technical Disclosure Bulletin*, vol. 22, No. 9, pp. 3923–3925.

"Dynamic Mouse Pointer that Indicates Selectability", IBM Technical Disclosure Bulletin, vol. 37, No. 04A, Apr. 1994.

"Disappearing–Reappearing Cursor", Disclosed Anonymously, Research Disclosure, p. 166, Feb. 1993.

"WYSIWIS Revised: Early Experiences with Multiuser Interfaces", M. Stefik et al., pp. 152, 159, and 160, ACM Transactions on Office Information Systems, vol. 5, No. 2, Apr. 1987, pp. 146–167.

Stefik, et al., "WYSI/WIS Revised: Early Experiences with Multi–User Interfaces," *Conference on Computer Supported Cooperative Work*, Dec. 3–5, 1986.

Morris, *HTML: For Fun and Profit*, SunSoft Press, Chapters 1–7, 1995.

"Show Me Shared App," Sun Microsystems, Inc., Available on Jun. 15, 1995 on the World Wide Web at http://www-.sun.com/products-n-solutions/sw/showme/products/ShowMe SharedApp.html.

*Primary Examiner*—John E. Breene
*Attorney, Agent, or Firm*—Townsend and Townsend and Crew LLP

[57] ABSTRACT

A system and method for computer operation. An object to be pointed to in a user's computer display (109) is indicated with an animated pointer icon (113). In a computer network, such as the Worldwide Web, a pointer is transmitted from one user to another user (114) via an improved protocol. A graphical design (201) of a computer icon is also disclosed.

19 Claims, 10 Drawing Sheets

5,784,056

SYSTEM AND METHOD FOR TEMPORALLY VARYING POINTER ICONS

BACKGROUND OF THE INVENTION

The present invention relates to the field of computer systems and their operation. More specifically, in one embodiment the invention provides an improved computer system and method of operation of a computer system in which objects on a computer display are indicated with an improved pointer. In a specific embodiment, a computer network is provided with a system and method for a user to point to an object on the display of another user in the computer network. A graphical design of an icon is also disclosed.

Various pointer systems for computer displays are well known to those of skill in the art. Most commonly, such pointers take the form of arrows, I-bars and other such elements. In the Windows environment, for example, such pointers are moved from one location to another by detecting a series of "mouse move" signals from a computer pointing device such as a mouse. Generally, the computer system monitors inputs from a mouse or similar pointing device, and in a roughly continuous manner, moves a pointer from one screen location to another. The pointer may be used to point to a variety of screen objects such as buttons, cursor bars, and a wide range of other screen objects.

In some situations it is desirable for a user to point to an object on a computer display that is on another user's screen. As a simple example, suppose that a user is remotely advising another user regarding a Web page design. Commonly, the first user would simply advise the second user by verbal communication such as through a telephone call or even over an internet voice link. It is often awkward or extremely difficult for one user to direct another's attention to a specific location on the screen display.

Solutions have been proposed to this problem. For example, remote pointing is supported by products such as telepointers. Such telepointers may be used to point to an object in a screen display, sometimes taking the form of a WYSIWIS (What You See Is What I See) display. In some cases the displays are maintained in a concurrent state by way of a controller/controllee relationship between the two displays. In such situations, the user at a controller display moves his or her pointing device, and the pointer on all of the displays of the other users is moved in unison. This enables one user to point to objects and allow others to see where the user is pointing. Such products include ShowMe SharedApp® from Sun Microsystems®, Inc. See also Stefik et al., "WYSIWIS Revised: Early Experiences with Multi-User Interfaces," Conference on Computer Supported Cooperative Work, Dec. 3–5, 1986.

While meeting with some success, such systems have also met with certain limitations. For example, in some systems users are not using the same system for rendering their respective displays on their computers. A common example of this situation is found in internet browsers where users each select their own internet browsing tool, font styles and colors, CPUs, operating systems, and monitors, often with the result that remote pointers cannot communicate with each individual user. Systems such as the Worldwide Web (WWW) are flexible through the use of a common HTML image transmission standard, but do not effectively support remote pointing. Further, the communication bandwidth that would be required to operate such systems using conventional controller/controllee techniques would create great burden on any network system. Such problems would be particularly apparent when users are in different countries, especially if some users have poor connections to the WWW.

From the above it is seen that improved systems and methods for pointing to objects on computer screens are needed, especially for use in computer networks.

SUMMARY OF THE INVENTION

An improved system and method for pointing to an object on a computer display is provided by virtue of the present invention. According to one specific embodiment of the invention, upon pointing to an object, a pointer icon changes appearance. An illustration of such changing appearance is a "raindrop" icon wherein an illustration of a drop of water appears in the display and expands over time.

The invention also includes a system for pointing to objects in a computer network. Pointer objects are embedded in a serial data stream when a first user points to an object. When the serial data stream is assembled on a second user's screen, the display includes a pointer at or near the location where the first user has pointed. An important application of the invention will be found in the Worldwide Web wherein pointers are embedded in HTML bit streams of images.

Accordingly, in one embodiment the invention provides a method of operating a computer including the steps of moving a pointer from one object to another object on a computer screen with a user input device; receiving user input for pointing to one of the objects on the computer screen; and changing an appearance of a pointing icon in response to the step of receiving user input for pointing to one of the objects.

The invention also includes a method for pointing to objects in a computer network including the steps of transmitting screen objects across the computer network in a serial form for display on a first user screen; receiving pointing input from a second user, the pointing input defining a location on the screen where the second user desires to point; inputting pointing objects into the serial stream; and displaying pointer graphics on said first user screen corresponding to said location where said second user desires to point.

A further understanding of the nature and advantages of the inventions herein may be realized by reference to the remaining portions of the specification and the attached drawings.

DESCRIPTION OF THE PREFERRED EMBODIMENTS

Figure 1:
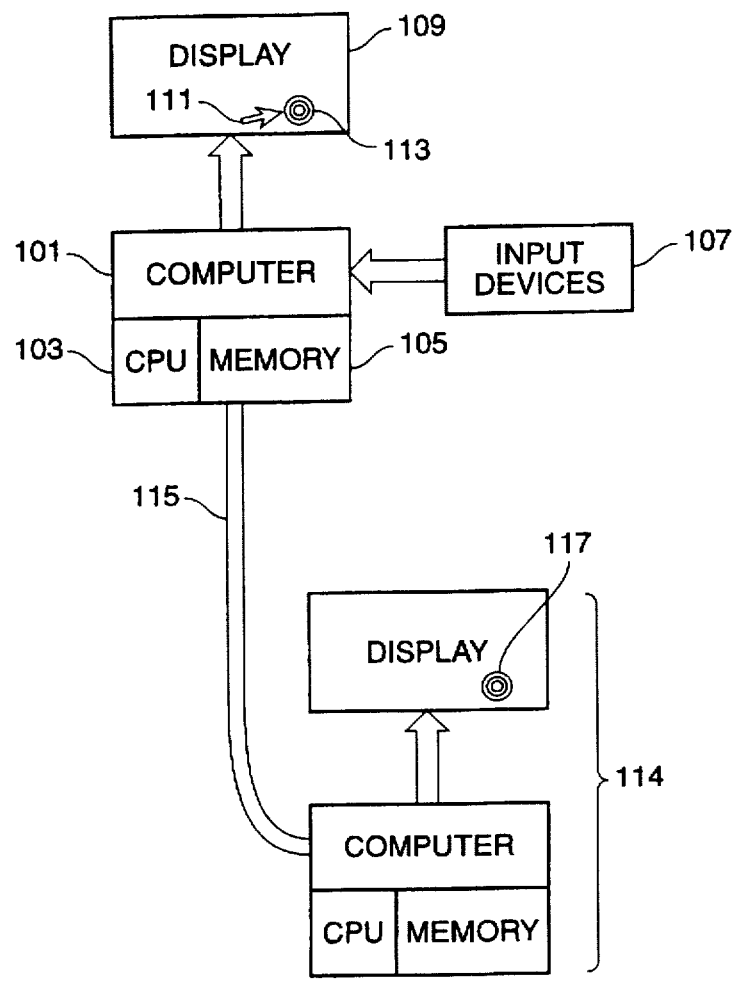
FIG. 1 is an overall block diagram of a computer system according to one embodiment of the invention herein.

FIG. 1 illustrates a computer network according to one embodiment of the invention. A computer 101 is provided with a central processing unit 103 and memory 105. Memory 105 may include, for example, RAM and a permanent storage media such as a magnetic and/or optical disks in which the software for generating pointers is stored (as well as other software). The computer 101 is coupled to one or more user input devices 107. User input devices 107 will typically include a pointing device such as a mouse and a keyboard. The computer provides output on display 109. The display will normally include one or more screen objects such as buttons, regions for user input, pulldown menus, sliders, and other objects. A pointer 111 is overlaid on the screen display and can be moved from one location to another on the screen by manipulation of one or more of the user input devices. Images may be generated on the display via one of a variety of systems such as via a Web page. One preferred browser used for this purpose is HotJava, a browser available from Sun Microsystems.

When the user has moved the screen icon to a desired location on the screen, the user provides input indicating a pointing operation. In some embodiments the pointing operation will be performed via a mouse click or pressing a designated key on the keyboard. In a particular embodiment the operation will be performed using a two button mouse in which the left mouse button is used for more conventional input such as pressing on displayed buttons or pointer bars, while the right or alternate mouse button is used to indicate a pointing operation.

When the user indicates that he/she desires to point to a particular object on the screen, a highlighted pointing operation may take place on the user's screen. Preferably, the highlighted pointing operation is conducted by displaying a highlight pointer icon 113 that changes temporally such that it will attract the attention of users more clearly. In some instances the highlighting pointer will be displayed for not only the user originating the pointing operation, but also others. In such cases, a remote computer system 114 linked by a network connection 115 is provided with a similar pointer 117 on its display. In these cases, one user may point to an object on another users screen with ease. In some instances (such as when a computer is used to generate a presentation) the pointer is displayed only on that particular user's display(s). In a preferred embodiment, each user is viewing a Web page generated from an HTML data stream. Each user will have his/her own browser software, which may or may not be the same browser software.

Figure 2A:
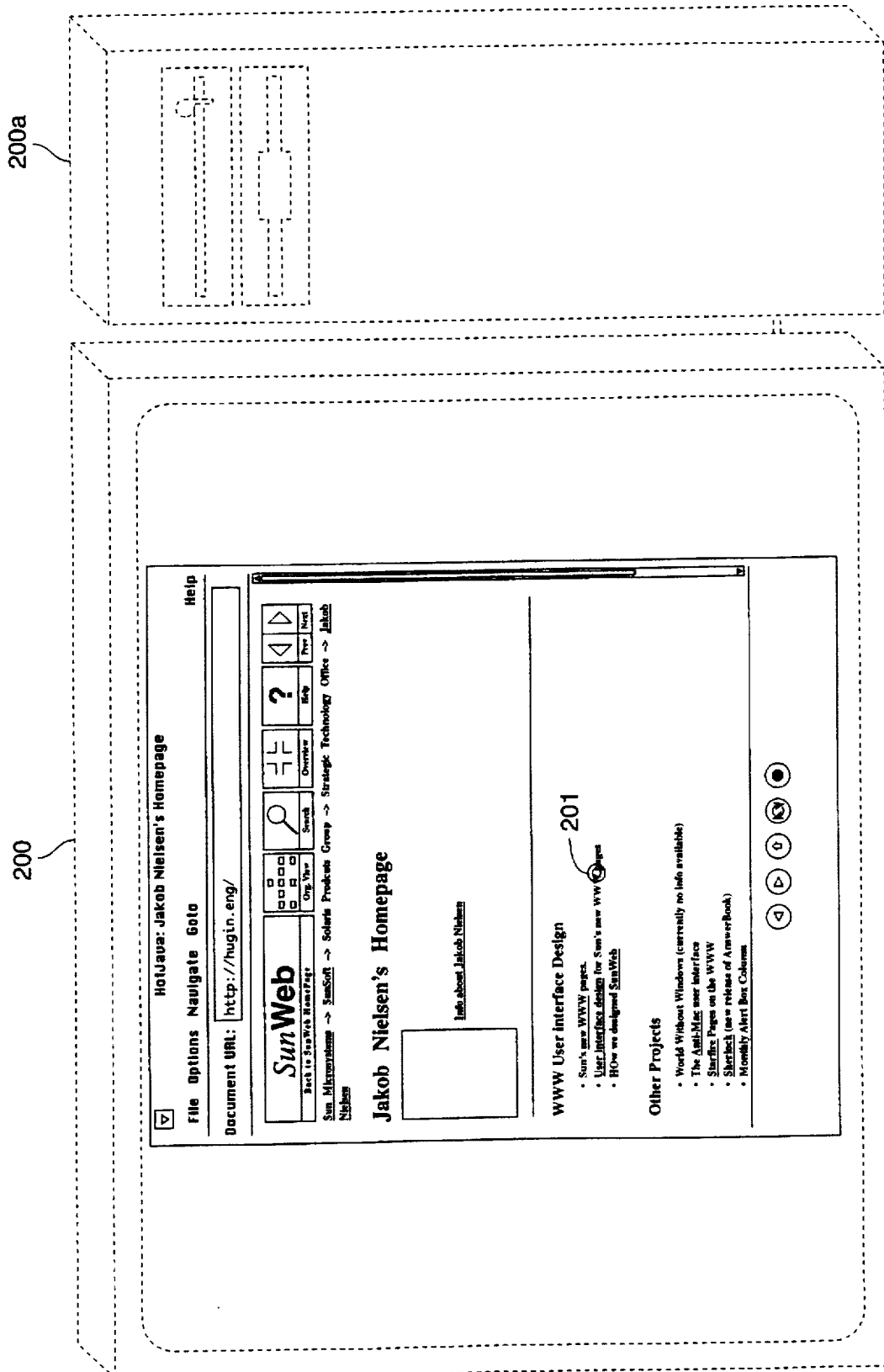
FIGS. 2A to 2G illustrate a dynamic pointer to an object on a computer display; the background of the screen and the computer itself are illustrated with broken lines only for purposes of showing the environment of the dynamic pointer and not for the purpose of the invention herein.
Figure 2B:
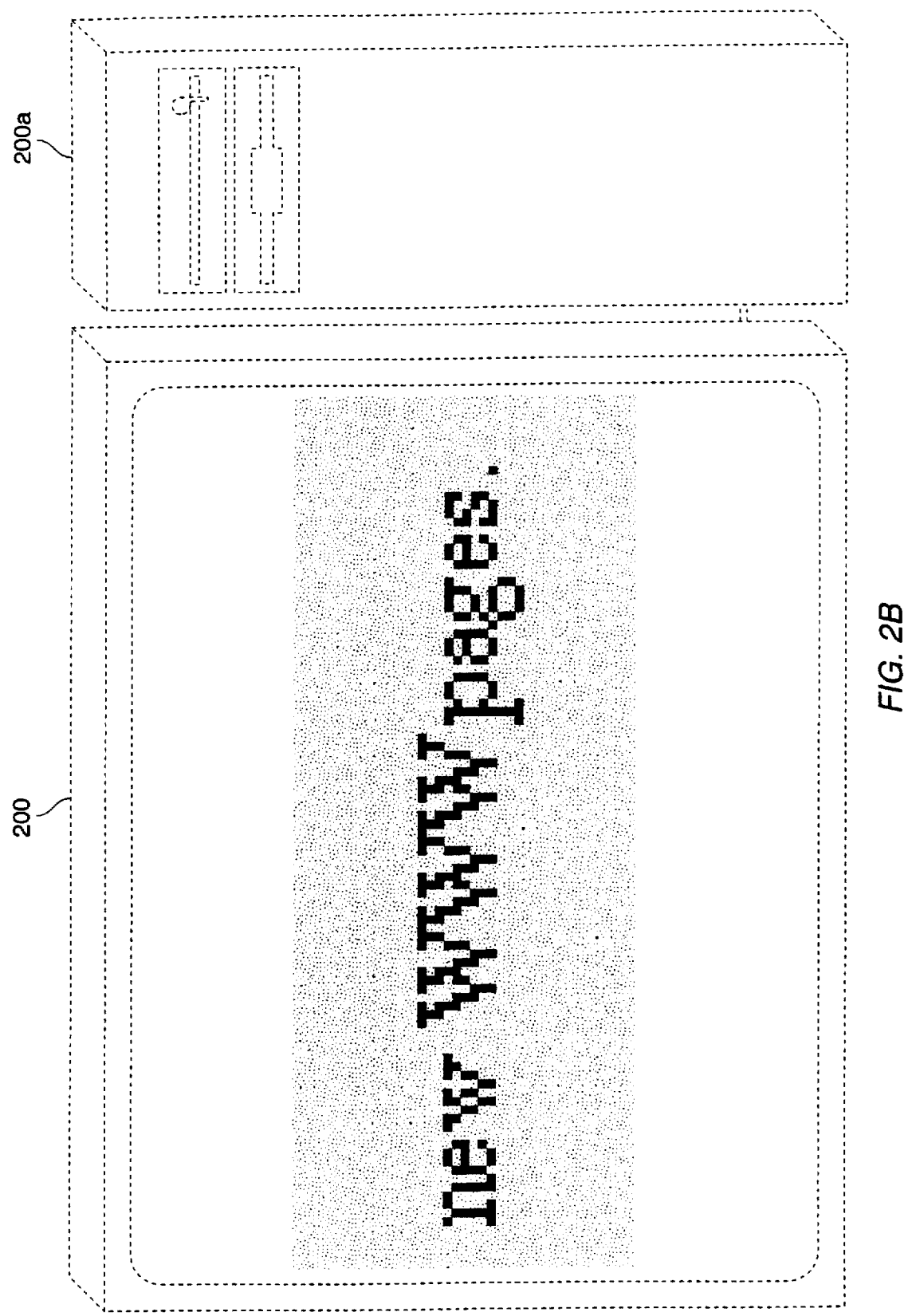
Figure 2C:
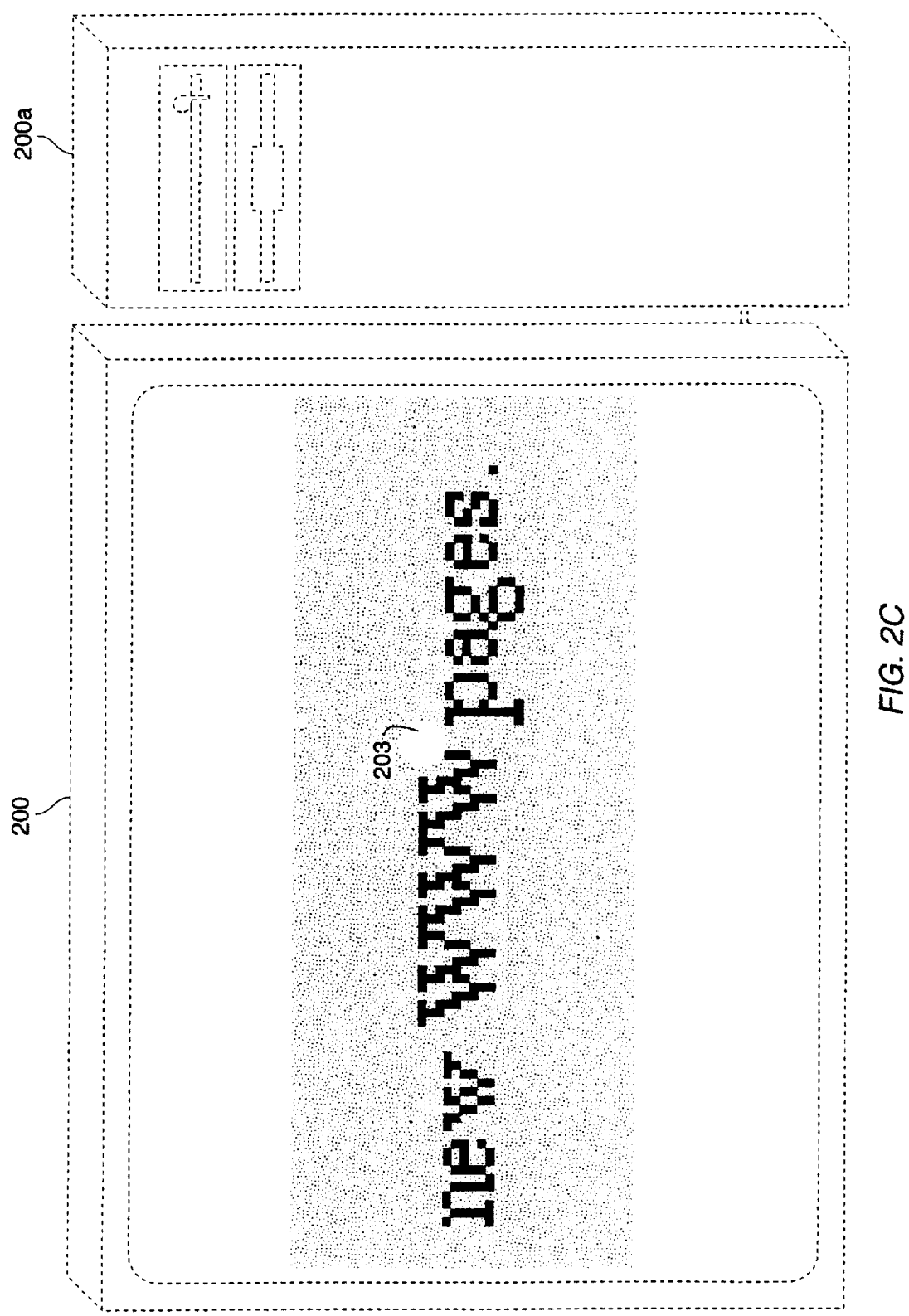
Figure 2D:
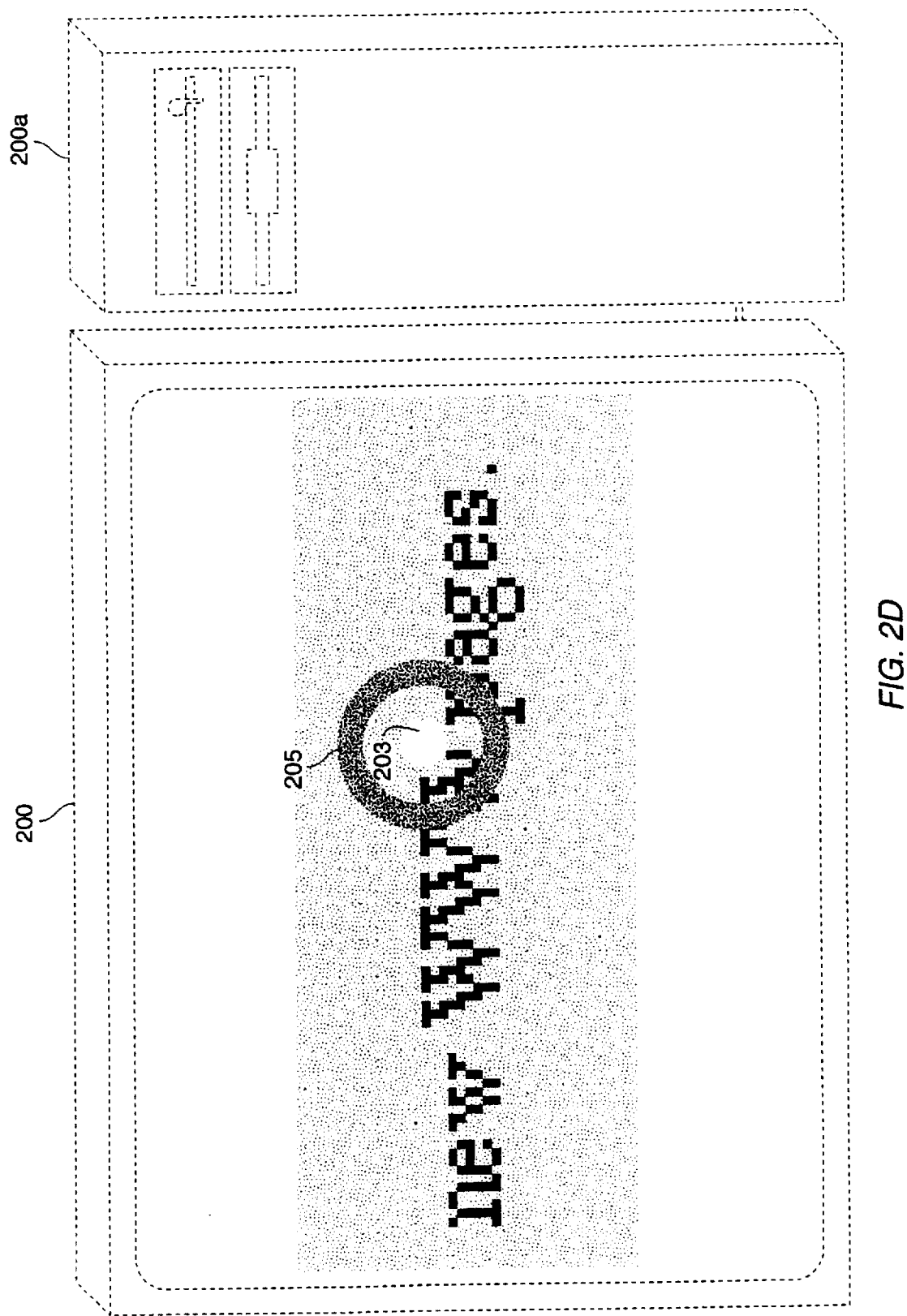
Figure 2E:
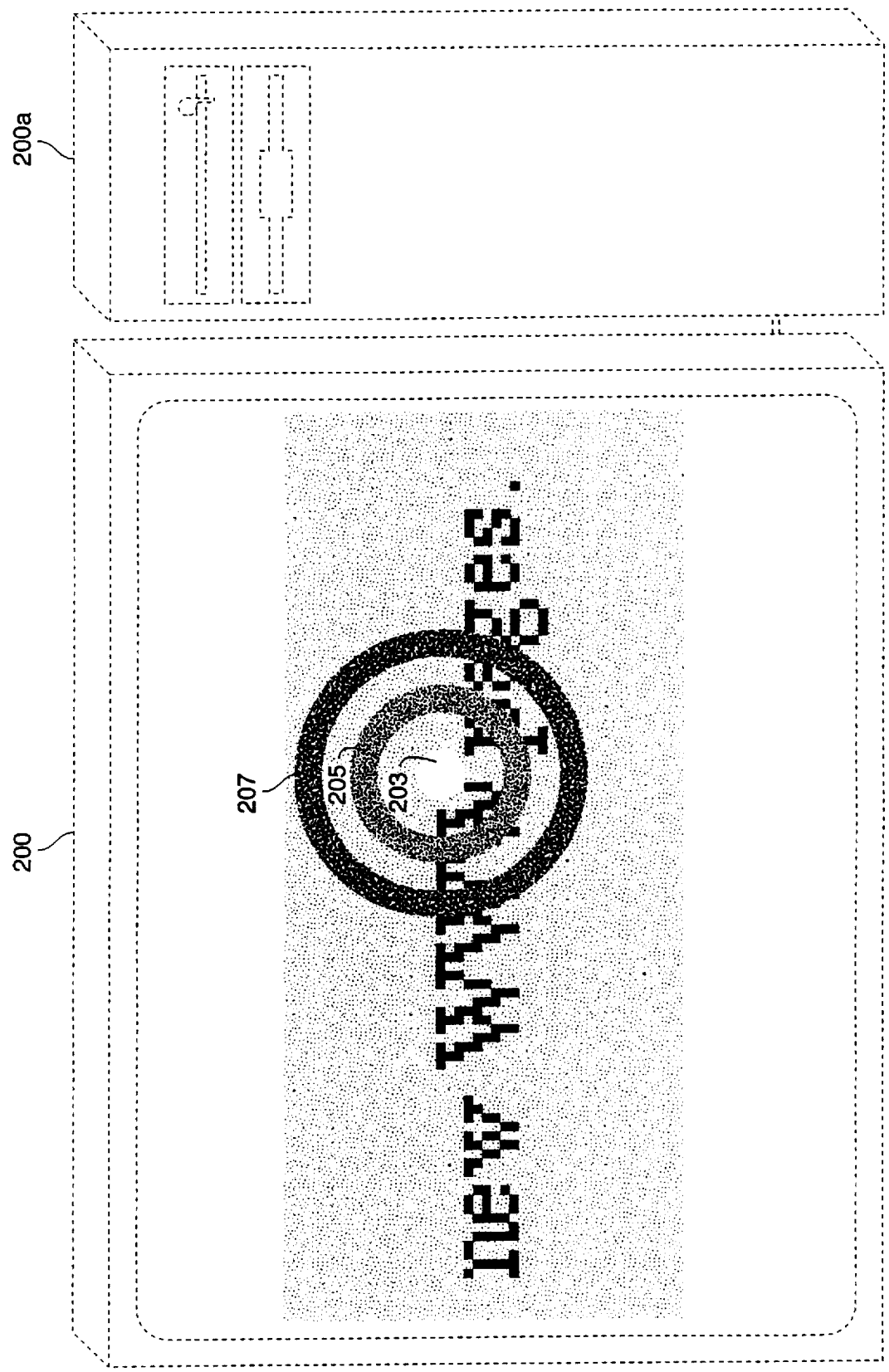
Figure 2F:
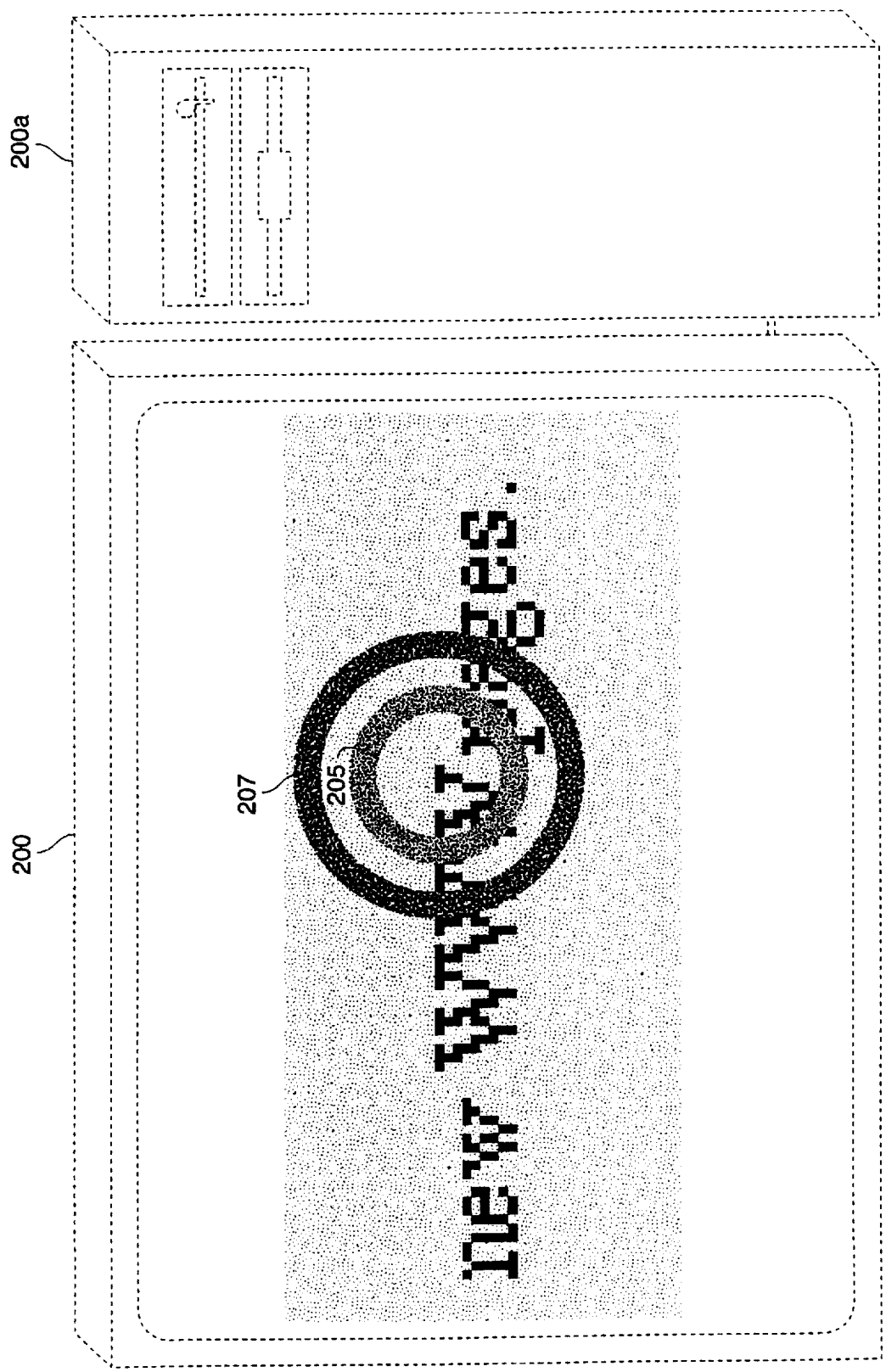
Figure 2G:
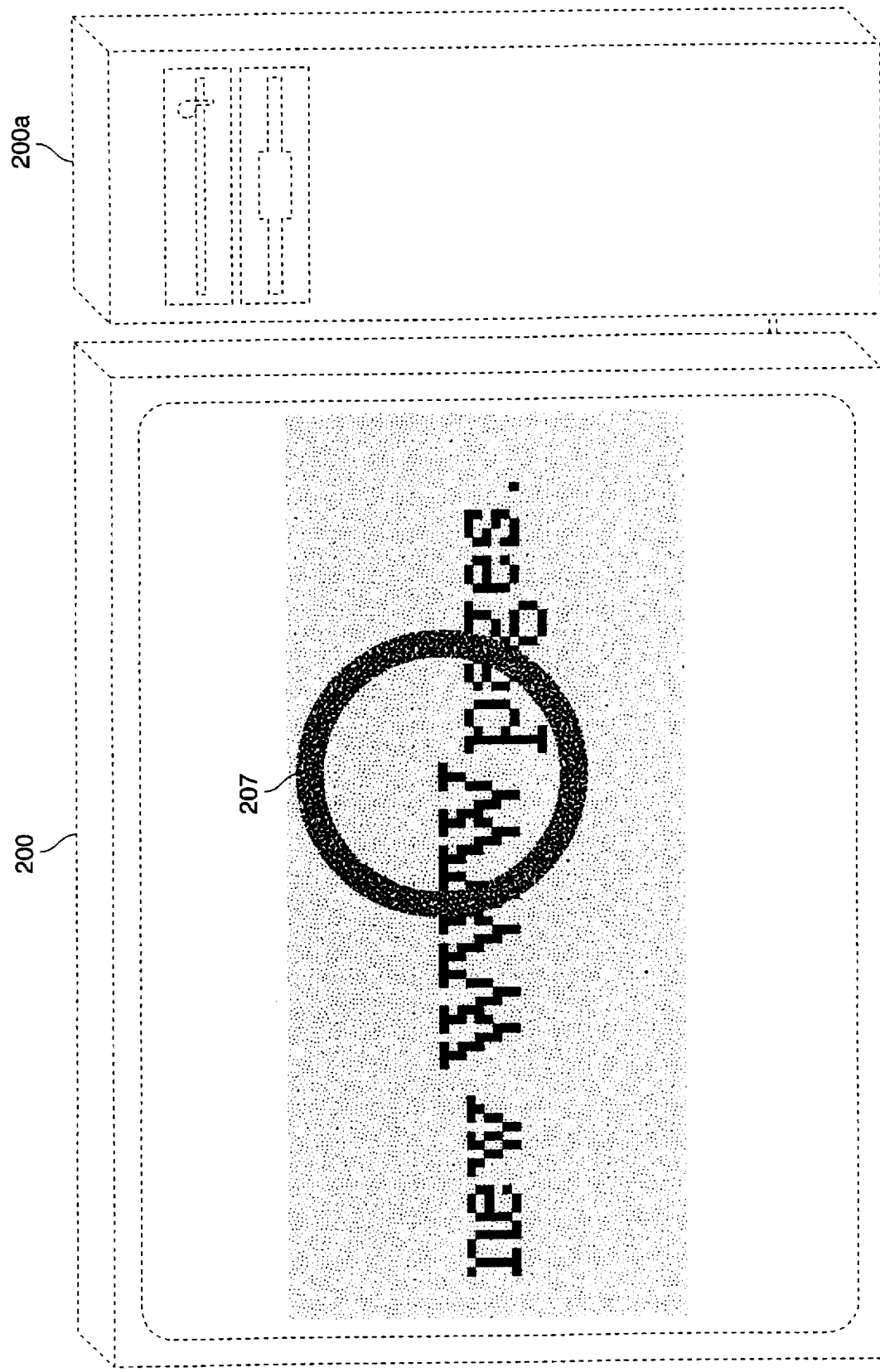

FIGS. 2A to 2G illustrate the graphical icon design utilized in a preferred embodiment of the invention for pointing to a screen object. A screen 200 and computer 200A are illustrated with broken lines in FIGS. 2A–2G only for purposes of showing the environment of the dynamic pointer and not for the purpose of the invention herein. As shown in FIG. 2A a pointer 201 is displayed with an appearance similar to that of a drop of water falling on the screen. FIGS. 2B to 2G illustrate the temporal variations in the appearance of the pointer icon. FIG. 2B illustrates a portion of the screen before the pointer is activated. FIG. 2C illustrates the icon in its initial form. As shown, a circular region 203 of "white space" on the screen is developed. In FIG. 2D the circular region 203 is surrounded by a dark region 205. In FIG. 2E the region 205 is surrounded by a darker region 207. In FIG. 2F the initially displayed white region 203 has been removed. In FIG. 2G the darker region 205 has been removed. Subsequent to the display in FIG. 2G the screen returns to its initial form as shown in FIG. 2B.

Figure 3:
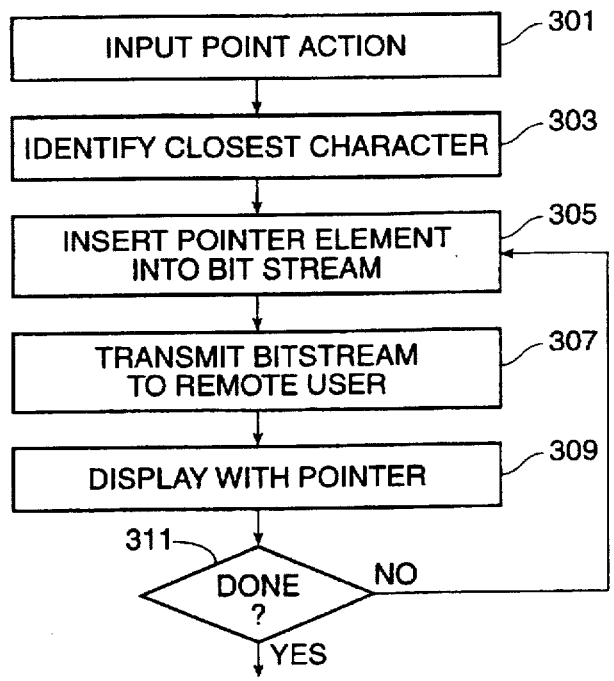
FIG. 3 illustrates a method for displaying a pointer icon on a computer display of a remote user.

FIG. 3 illustrates the overall methodology utilized to transmit a pointer from one user to another user according to a preferred embodiment of the invention. At step 301 the system (which may include, for example, the computers of the two users and intervening network computers) inputs a pointing action from a user via, for example, a button push on a mouse, input from a touch screen display, or from another user input device. At step 303 the system (application program, generating system, and/or hardware) identifies a closest character or object on the screen adjacent to the location where the pointing action has taken place. In the HTML context, this step includes identifying the position in the HTML stream corresponding to this closest character or object. In the event that the user has the pointer 111 directed to a specific character or screen object, this object will be chosen as a marked object. In cases where the user has pointed to a location on the screen where no object is displayed, the system will determine the distance to a plurality of adjacent screen objects, and select the object closest to the pointer location when the pointing operation has taken place. For example, in the HTML data format of the WWW, the screen location is identified to the system when a user enters a button click operation. The system then calculates the distance to each of a plurality of adjacent characters that have been generated by virtue of the HTML generated display. The pointer icon image(s) are then inserted before or after this character in the HTML data stream.

At step 305 the system inserts a pointer element into a serial bit stream for transmission of an image to a remote user. A pointer element may refer to an image, object, or even a single indication (like a bold or italic mark in HTML) that indicates a pointer should be displayed. One approach is to provide an extension to the HTML standard that includes a special formatting code that indicates a pointer should be displayed. In some embodiments, the remote user already has a display painted on his/her screen and the system transmits only a series of characters indicating where the existing display is to be changed. At step 307 the bit stream with the pointer element is transmitted to the remote user. At step 309 the remote user's computer system displays the screen image with the pointer icon in place.

In some embodiments the pointer icon's image will vary temporally. Accordingly, in such embodiments the system will perform a test at step 311 to determine if the pointer display operation is complete. If not, the system will return to step 305 wherein a revised screen image will be generated, providing the user with the perception that the pointer icon is changing with time (the example above being in the form of a drop of water falling on the screen). In other embodiments, the transmission of a single pointer character or element will cause the remote user's system to generate the changing pointer image locally. For example, a pointer indicator may be inserted in the HTML data stream and the local browser may be programmed to paint a changing icon upon receipt of the pointer indicator.

Figure 4:
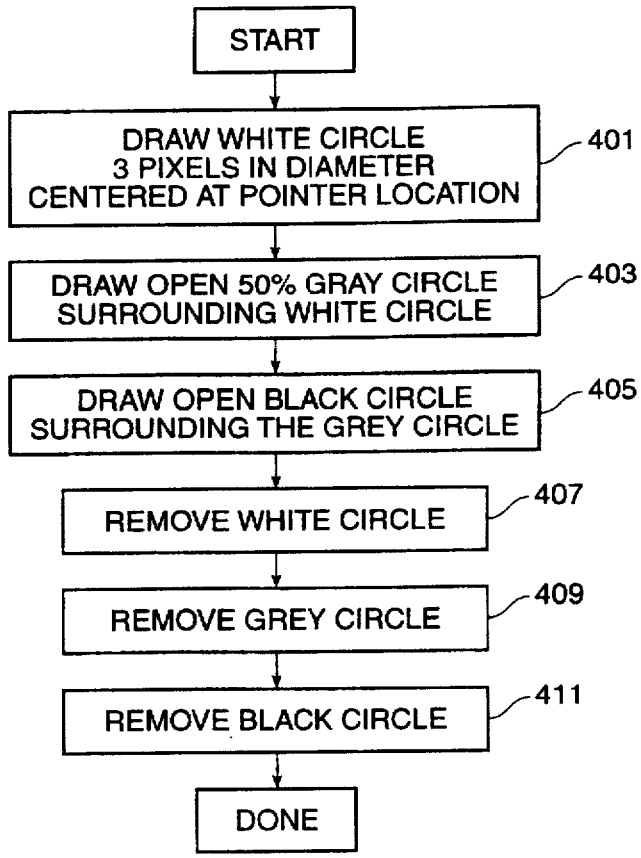
FIG. 4 illustrates a method for generating a particular temporally varying pointer icon.

FIG. 4 illustrates a process for generating a temporally varying pointer icon in a particular case of a water drop-type of image. As shown, the system first generates a white circle 3 pixels in diameter centered at the location where pointing is desired at step 401. At step 403 the system draws an open 50% grey circle surrounding the white circle. At step 405 the system draws an open black circle surrounding the grey circle. At step 407 the system removes the white circle, and at steps 409 and 411 the system removes the grey and black circles, respectively. The image displayed according to this particular embodiment of the invention will have the appearance of a drop of water falling on the screen.

Preferably, the elements displayed according to FIG. 4 are displayed over a period of about 0.5 seconds each, and are removed from the screen in another group of 0.5 second intervals each. Therefore, the entire pointing process takes place over a time span of more than 1 second, preferably more than about 2 seconds, and most preferably more than 2.5 seconds, but preferably less than 5 seconds. This is enough time to draw the user's attention to the screen location without significantly obscuring the display.

Figure 5:
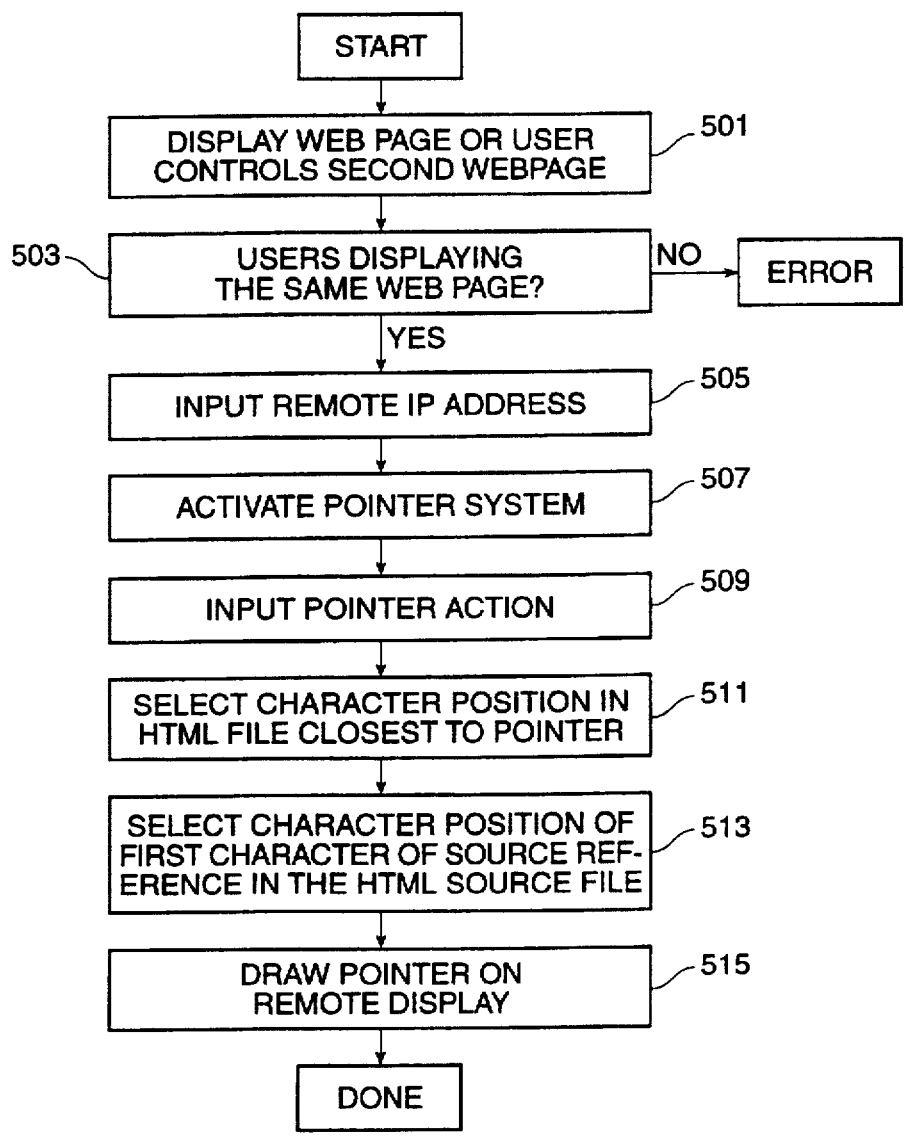
FIG. 5 illustrates a method for transmitting a pointer icon from one user to another user in a computer network, using the Worldwide Web as an example.

FIG. 5 illustrates the process of generating a pointer icon remotely in greater detail, using the Worldwide Web as an illustration with the known convention of the HTML transmission format. The transmission of images over the Worldwide Web is well understood to those of skill in the art, and is described in some detail in Morris, HTML For Fun and Profit, SunSoft Press, 1995, incorporated herein by reference for all purposes.

At step 501 the system displays a Web page common to both a local and a remote user, or the local user controls the remote user Web page. At step 503 the system checks to determine if the same Web page is displayed at both the local and remote user's location. If not, an error message is displayed.

At step 505 the system inputs the remote IP address of the remote user. At step 507 the system optionally activates the pointer system (assuming it is not always active). At step 509 the system inputs a remote pointer action such as a mouse click. At step 511 the system selects a character position in the HTML data file for the current Web page closest to that of the pointer. At step 515 the pointer is transmitted and drawn on the remote user display.

The HTML format is known to those of skill in the art. Generically, a Web page includes a stream of bits including a header and title, comments, a body, and an address. Text is marked with various formatting characters such as paragraph format indicators, character format indicators, and list format indicators. Image, sound, and animated video may be inserted into the bit stream according to recognized standards. According to a preferred embodiment herein, after selection of a location for the pointer icon, an image of the first "part" of a temporally varying pointer icon is inserted into the HTML bit stream as, e.g., a GIFF, TIFF, or JPEG bitmap, using an image or <IMG>tag. Preferably, transparent cells are utilized such that the pointer icon may be overlaid on the object that is of interest. In a transparent display, the darkness of the previous screen display and the screen display after the addition of the pointer icon are considered. If a pixel in the "underlying" image is dark, it makes that pixel darker when the "overlying" pointer icon is added.

The above description is illustrative and not restrictive. Many variations of the invention will become apparent to those of skill in the art upon review of this disclosure. Merely by way of example, while the invention has been illustrated primarily with regard to generation of "raindrop" pointers over the Worldwide Web, the invention is not so limited. The scope of the invention should, therefore, be determined not with reference to the above description, but instead should be determined with reference to the appended claims along with their full scope of equivalents.

What is claimed is:

1. A method of operating a computer comprising the steps of:

displaying a graphical display on a computer screen;

moving a pointer icon from one object to another object on said computer screen with a user input device;

receiving a first user's input for pointing to one of said objects on said computer screen; and thereafter temporally varying an appearance of said pointer icon in response to said step of receiving said first user's input for pointing to one of said objects.

2. The method as recited in claim 1 further comprising the steps of:

transmitting a pointer signal to a second user, wherein said step of temporally varying an appearance of said pointer icon is performed on at least said second user's computer screen.

3. The method as recited in claim 1 wherein said step of temporally varying comprises displaying said pointer icon having an appearance similar to a drop of water falling on said screen.

4. The method as recited in claim 1 wherein said step of temporally varying comprises terminating display of said pointer icon after a period of time.

5. The method as recited in claim 2 wherein said step of temporally varying an appearance is performed on said first user's computer screen.

6. The method as recited in claim 1 wherein said graphical display is generated over a computer network on at least said first user's computer screen and a second user's computer screen.

7. The method as recited in claim 6 wherein said graphical display comprises a Web page.

8. The method as recited in claim 2 wherein said step of transmitting a pointer signal comprises the steps of:

identifying an object in said graphical display closest to said pointer icon after receiving said first user's input; and inserting a pointer element into a serial bit stream to be transmitted to said second user.

9. The method as recited in claim 8 wherein said serial bit stream comprises an HTML bit stream.

10. A method for pointing to objects in a computer network comprising the steps of:

transmitting screen objects across said computer network in a serial data stream for display on a first user screen;

receiving pointing input from a second user, said pointing input defining a location on said first user screen where said second user desires to point;

inputting pointing objects into said serial data stream; and displaying a pointer icon on said first user screen corresponding to said location where said second user desires to point, wherein said step of displaying said pointer icon comprises the step of temporally varying an appearance of said pointer icon on said first user screen.

11. The method as recited in claim 10 wherein said serial data stream comprises an HTML data stream.

12. The method as recited in claim 10 wherein said step of inputting pointer objects into said serial data stream comprises the steps of:

identifying a screen display object closest to said location where said second user desires to point; and placing said pointing objects into said serial data stream at a position in correspondence with said identified screen display object.

13. A computer system comprising:

a computer network for generating screen displays on a plurality of user computers, said screen displays generated by the steps of:

transmitting serial data streams to said users;

generating screen displays based on said serial data streams; and a pointing system comprising a pointer element that is inserted into said serial data stream, wherein said pointing system generates temporally varying pointer icons.

14. A computer system as recited in claim 13 wherein said system for transmitting serial data streams comprises a system for transmitting HTML data streams.

15. A computer system as recited in claim 13 wherein said pointing system identifies a closest screen object to a pointer icon, and selects said closest screen object in said serial data stream for insertion of said pointer element.

16. The method as recited in claim 1 further comprising the steps of:

displaying said pointer icon on said computer screen, wherein said step of displaying said pointer icon occurs before said step of temporally varying said appearance of said pointer icon.

17. A computer program product for displaying an icon on a computer screen, said product comprising:

code that generates a pointer icon in a remote display;

code that temporally varies an appearance of said pointer icon;

code that inserts a pointer element in a serial data stream, and a computer-readable medium for storing said codes.

18. The computer program product as recited in claim 17 further comprising:

code that identifies a location of a nearest object to a user-defined location.

19. The computer program product as recited in claim 18 further comprising:

code that inserts a pointing indicator adjacent a character in a serial data stream adjacent said nearest object.

* * * * *